(12) United States Patent  (10) Patent No.: US 8,194,312 B2
Mitzkus et al.  (45) Date of Patent: Jun. 5, 2012

(54) OPTICS CHANGER

(75) Inventors: Reiner Mitzkus, Goettingen (DE); Peter Schnuell, Gleichen (DE); Frank Bauer, Gleichen (DE); Uwe Wolf, Magdala (DE); Hubert Wahl, Stadtroda (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 83 days.

(21) Appl. No.: 12/745,457

(22) PCT Filed: Nov. 3, 2008

(86) PCT No.: PCT/EP2008/009246
§ 371 (c)(1),
(2), (4) Date: Jun. 26, 2010

(87) PCT Pub. No.: WO2009/068153
PCT Pub. Date: Jun. 4, 2009

(65) Prior Publication Data
US 2010/0309573 A1 Dec. 9, 2010

(30) Foreign Application Priority Data
Nov. 29, 2007 (DE) .................. 10 2007 057 436

(51) Int. Cl.
*G02B 21/00* (2006.01)
(52) U.S. Cl. ....................................... 359/381
(58) Field of Classification Search ......... None
See application file for complete search history.

(56) References Cited

U.S. PATENT DOCUMENTS

| | | | |
|---|---|---|---|
| 3,485,548 A * | 12/1969 | Brebant et al. | 359/367 |
| 4,176,916 A | 12/1979 | Carpenter | |
| 4,329,014 A * | 5/1982 | Reinheimer et al. | 359/227 |
| 4,487,486 A * | 12/1984 | Hayasaka | 359/387 |
| 4,869,021 A * | 9/1989 | Gregory | 49/171 |
| 6,313,944 B2 | 11/2001 | Kawahito | |
| 6,636,352 B2 | 10/2003 | Engelhardt | |
| 2001/0008461 A1 * | 7/2001 | Koyama et al. | 359/380 |
| 2007/0047075 A1 | 3/2007 | Wahl et al. | |

FOREIGN PATENT DOCUMENTS

| | | |
|---|---|---|
| DE | 100 31 720 A1 | 1/2002 |
| DE | 10250567 A1 | 5/2004 |
| DE | 102 58 988 A1 | 7/2004 |

(Continued)

OTHER PUBLICATIONS

International Preliminary Report on Patentability and Written Opinion for WO 2009/068153, 5 pages.

(Continued)

*Primary Examiner* — Derek S Chapel
(74) *Attorney, Agent, or Firm* — Skaar Ulbrich Macari, P.A.

(57) ABSTRACT

The invention relates to an optics changer for arranging an optical element in a target position in a changer chamber of an optical device accessible from the outside via a insertion channel, including a base frame and the optical element that is pivotally fastened to the base frame via a swivel mechanism, wherein the swivel mechanism effects a pivoting movement of the optical element when the optics changer is inserted through the insertion channel in the changer chamber starting at a predetermined insertion depth such that after inserting, the optical element is placed and pivoted in the target position.

12 Claims, 8 Drawing Sheets

FOREIGN PATENT DOCUMENTS

| | | |
|---|---|---|
| DE | 10 2005 040 834 A1 | 3/2007 |
| DE | 10 2005 043 103 A1 | 3/2007 |
| DE | 10 2006 022 936 A1 | 11/2007 |
| DE | 10 2006 024 109 A1 | 11/2007 |
| EP | 0055209 A2 | 6/1982 |
| WO | WO 2004/055571 A1 | 7/2004 |
| WO | WO 2007/028519 A1 | 3/2007 |
| WO | WO 2007/134698 A1 | 11/2007 |
| WO | WO 2009/068153 A1 | 6/2009 |

OTHER PUBLICATIONS

English translation of International Preliminary Report on Patentability and Written Opinion for WO 2009/068153, dated Jun. 10, 2010, 9 pages.

English Translation of search report by the German Patent Office for German Patent Application 10 2007 057 436.5, dated, Sep. 29, 2008.

English translation of International Preliminary Report on Patentability and Written Opinion for WO 2009/068153, dated Jul. 6, 2010, 6 pages.

* cited by examiner

OPTICS CHANGER

FIELD

The present invention relates to an optics changer for arranging an optical element in a target position in a changer chamber of an optical apparatus accessible from the outside via an insertion channel.

BACKGROUND

It is frequently desired in optical apparatuses such as microscopes that customers are able to exchange an optical element themselves (e.g. in the beam path in the lens revolver support of a microscope). There is often the difficulty that the available overall space of the optical apparatus would be able to accommodate the optical element, but that such space is hardly accessible from the outside. That is why frequently no possibilities are provided to the customers in optical apparatuses to exchange an optical element. If the optical apparatus offers the possibility for such an exchange nevertheless, it is often difficult to perform. It is usually necessary to dismount various components in order to arrange the optical element. These components obviously need to be mounted again later on, which strongly limits the rapid and user-friendly exchange.

SUMMARY

On the basis of this it is therefore the object of the present invention to provide an optics changer for arranging an optical element in a target position in a changer chamber of an optical apparatus accessible from the outside via an insertion channel, with which a simple arrangement of the optical element in the target position is enabled.

This object is achieved by an optics changer for arranging an optical element in a target position in a changer chamber of an optical apparatus accessible from the outside via an insertion channel, comprising a base frame and the optical element which is pivotably fastened to the base frame via a swivel mechanism, wherein the swivel mechanism effects a pivoting movement of the optical element when the optics changer is inserted through the insertion channel in the changer chamber starting at a predetermined insertion depth such that after completing the insertion the optical element has been pushed and pivoted to the target position.

It is possible with such an optics changer to arrange the optical element in the target position in the changer chamber, even when the insertion channel has smaller dimensions than the changer chamber. Thus, it is possible to minimize the size of the insertion channel, whereby enabling the exchange of the optical element by the customer even in the case of complex optical apparatuses where there is little space for the insertion channel.

The insertion is preferably a linear movement, so that the customer or user needs to insert the optics changer only through the insertion channel in order to arrange the optical element in the target position.

The changer can be arranged in such a way that the swivel mechanism prevents any pivoting or turning of the optical element relative to the base frame during the insertion of the changer up to the predetermined insertion depth. As a result, the optical element only performs the insertion movement (together with the base frame) up to the predetermined insertion depth. The swivel mechanism only ensures from the predetermined insertion depth that the optical element performs a pivoting movement relative to the base frame in addition to the insertion movement (together with the base frame) in order to thus reach the target position.

In particular, the optics changer comprises a guide for the insertion and/or pivoting movement. This guide can be arranged for example by the insertion channel itself. Furthermore, the changer chamber or parts thereof can be used as a guide.

The optics changer may comprise a holding unit which holds the optical element in the target position. It is thus ensured that the optical element, once it is arranged in the target position, will permanently remain in the same.

In particular, the holding unit can press the optical element in the target position against a stop of the optics changer. This can occur by means of a spring for example, so that a desired arresting in the target position will occur.

In the optics changer, the swivel mechanism can arrest the optical element in a shifting position during the insertion of the optics changer up to the predetermined insertion depth and produce the pivoting movement from the shifting position only from the predetermined insertion depth. As a result, the space required by the optics changer in the insertion channel and thus the dimensions of the insertion channel itself can be minimized.

In particular, the shifting position can be a parallel alignment in relation to a plane in which the shifting movement occurs. In the case of a horizontal shifting, the optical element can be aligned horizontally.

The base frame of the optics changer can have two parallel legs, between which the optical element is arranged in such a way that the swivel axis extends perpendicularly in relation to the direction of extension of the two legs. This is an especially simple arrangement of the base frame which can be arranged in a substantially U-shaped manner, when seen in a top view.

The shifting position can lie in a plane in the optics changer in which the two legs extend. In the target position, the optical element can be tilted in relation to this plane. In particular, this tilting can be 45°. In this case the optical element can be arranged as a beam splitter or a partially transparent plate.

The optical element can be arranged in a receiving frame which comprises three contact surfaces which rest in the target position on a guide surface in the changer chamber. A uniquely determined positioning of the receiving frame in the target position can thus be realized.

The swivel mechanism can be arranged in such a way that the swivel axis extends parallel to the insertion direction in the insertion channel. The swivel axis can also enclose an angle between 0° and 90° with the insertion direction. The swivel axis can also extend perpendicularly in relation to the insertion direction. The swivel axis preferably lies in the plane (or parallel thereto) in which the optical element lies during the insertion through the insertion channel up to the predetermined insertion depth, and from which it is then pivoted or turned from the predetermined insertion depth.

The optics changer can further be arranged in such a way that it can be inserted into the insertion channel precisely in one single alignment. A reverse insertion of the optics changer into the insertion channel is thus prevented.

The optical element can especially be arranged in a receiving frame which is longitudinally displaceable relative to the base frame. A spring is preferably arranged in this case between the receiving frame and the base frame, which spring presses the two frames apart. This can be used in the inserted position of the optics changer in order to arrest the optical element or the receiving frame in a spring-elastic manner in the target position.

An optical apparatus, especially a microscope, is further provided, comprising a changer chamber accessible from the outside via an insertion channel, with the microscope having an optics changer in accordance with the invention or an optics changer according to a further development in accordance with the invention. An optical apparatus is thus provided in which an optical element can be exchanged easily.

Furthermore, a method is provided for arranging an optical element in a target position in a changer chamber of an optical apparatus which is accessible from the outside via an insertion channel and in which the optical element is inserted from the outside into the insertion channel and is additionally pivoted from a predetermined insertion depth in such a way that after the completion of the insertion the optical element has been pushed and pivoted to the target position.

The optical element can be positioned easily in the target position in the changer chamber with the method in accordance with the invention.

It is understood that the features mentioned above and yet to be explained below can be used not only in the stated combinations but also in other combinations or alone without departing from the scope of the present invention.

The invention will be explained below in closer detail by way of example by reference to the enclosed drawings which also show features relevant to the invention, wherein:

DETAILED DESCRIPTION

Figure 1:
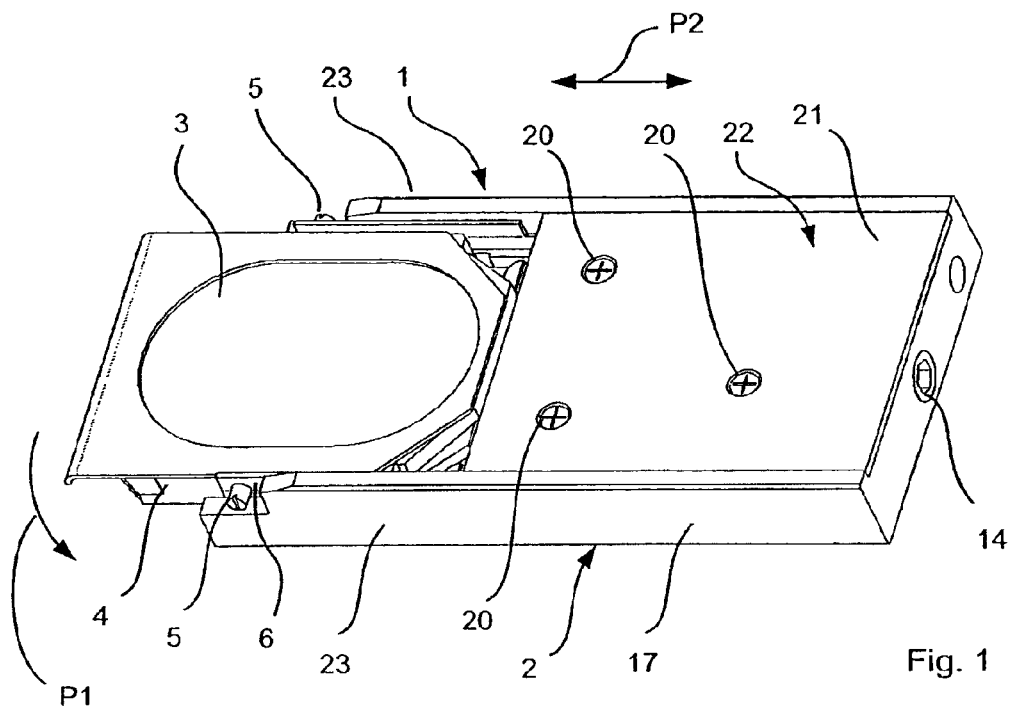
FIG. 1 shows a perspective view of an optics changer according to a first embodiment.

The optics changer 1 according to the first embodiment comprises a base frame 2 (FIG. 1) which carries a beam splitter in a tension-free manner as an optical element 3. The beam splitter 3 sits in a receiving frame 4 which is fastened to an intermediate frame 6 via cylindrical pins 5 in a rotatable or pivoting manner (arrow P1).

The intermediate frame 6 is displaceable relative to the base frame 2 in the longitudinal direction (indicated by a double arrow P2 in FIG. 1), as will be explained below in closer detail.

As is shown especially in FIGS. 2 and 5, a substantially U-shaped first pressure spring 7 is fastened at the bottom to the intermediate frame 6, the two free legs 8 of which press against the receiving frame 4 from below, so that the beam splitter is disposed in the idle or transport position as shown in FIG. 1.

Figure 2:
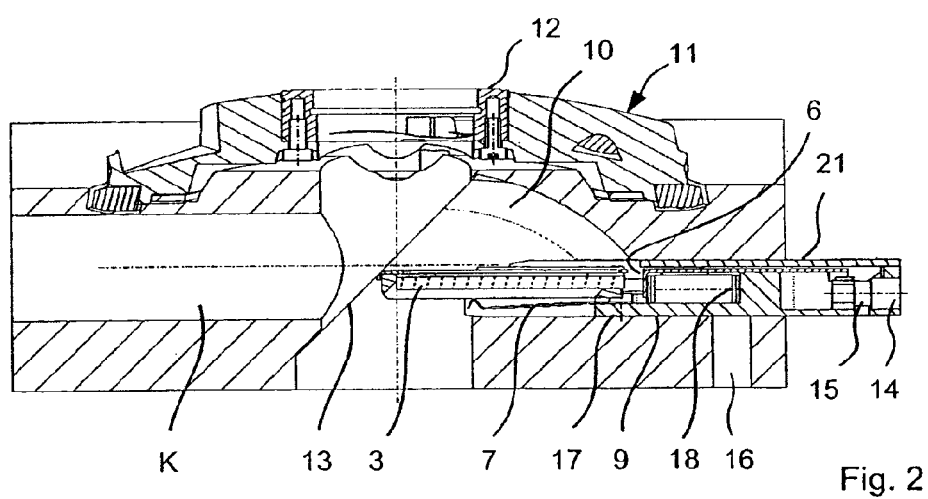
FIG. 2 shows a sectional view which shows the optics changer of FIG. 1 which is inserted at least partly into a lens revolver support.
Figure 6:
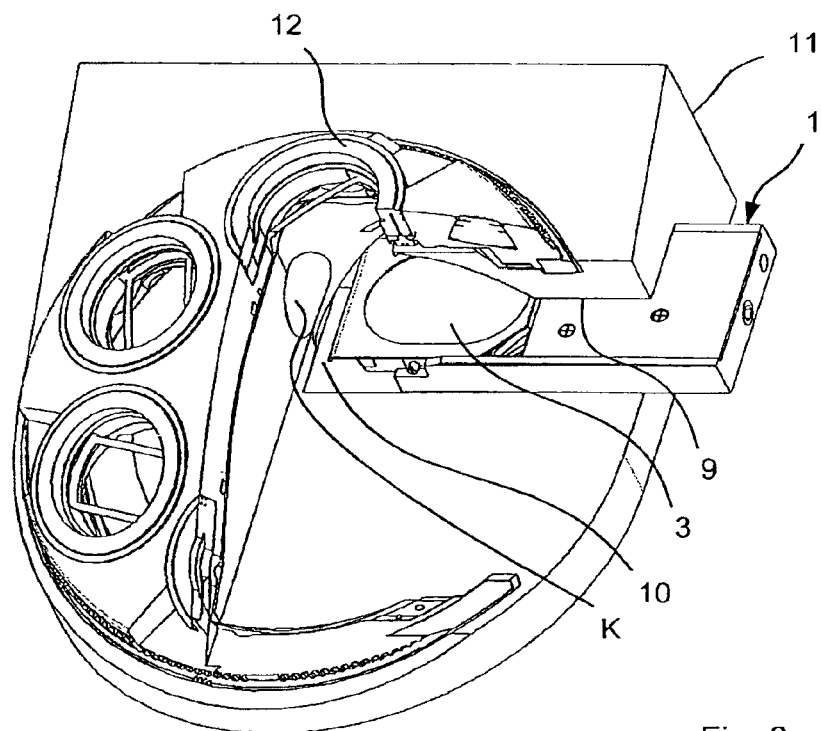
FIG. 6 shows a perspective view of the partly inserted optics changer 1.

FIGS. 2 and 6 show the changer 1 in a state in which it is inserted partly via an insertion channel 9 into a changer chamber 10 of a lens revolver support 11 of a microscope which comprises a lens contact surface 12. The lens revolver support 11 further comprises a guide surface 13 in the changer chamber 10, on which currently abuts the front, slightly bent end of the receiving frame 4. A further insertion of the optics changer 1 leads to the consequence that the front end of the receiving frame 4 will yield downwardly along the guide surface 13 and thus the receiving frame 4 performs a pivoting movement about the axis of the cylindrical pins 5. The optical element 3 is thus partly raised.

Figure 3:
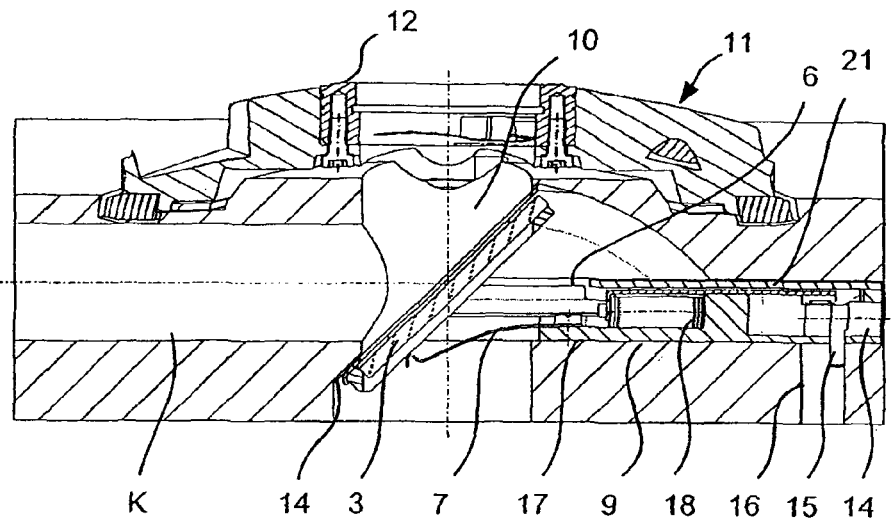
FIG. 3 shows a sectional view which shows the optics changer 1 inserted completely in the lens revolver support.
Figure 7:
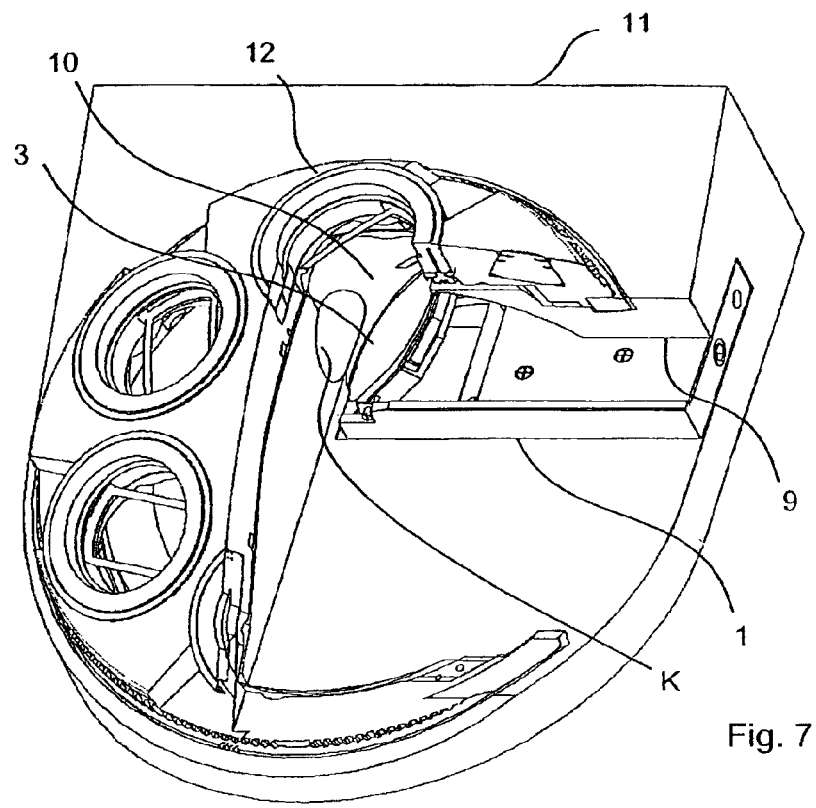
FIG. 7 shows a perspective view of the fully inserted optics changer 1.

The optics changer 1 is inserted further into the changer chamber 10 for such a time until the receiving frame 4 rests on the guide surface 13 in the target position as shown in FIGS. 3 and 7.

Figure 4:
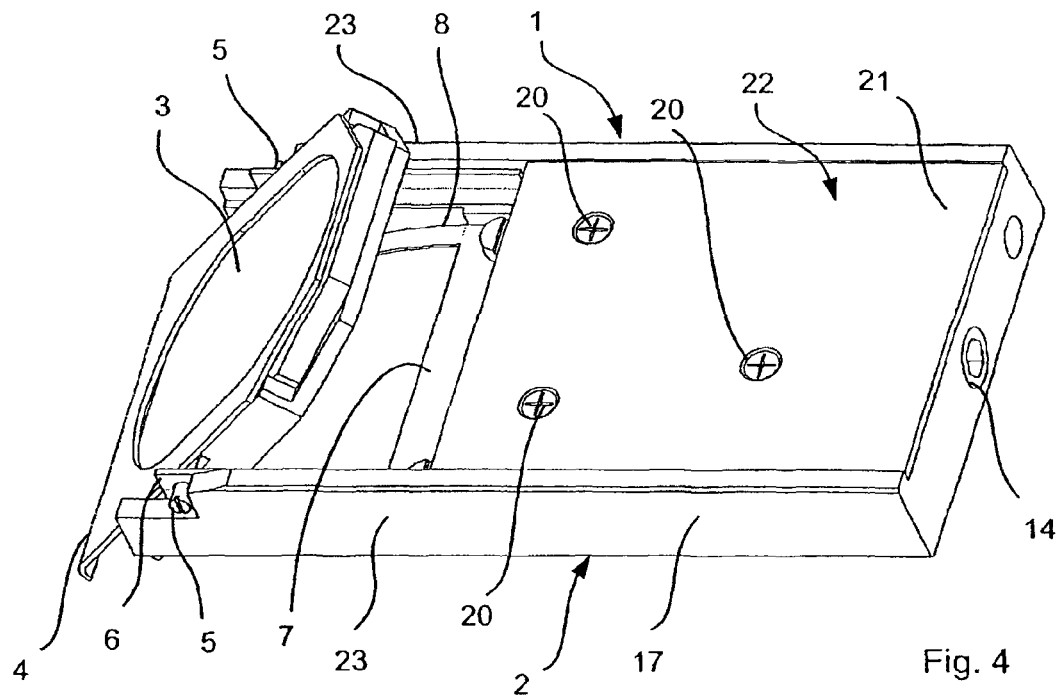
FIG. 4 shows a perspective view of the optics changer 1 in the insertion position of FIG. 3.
Figure 5:
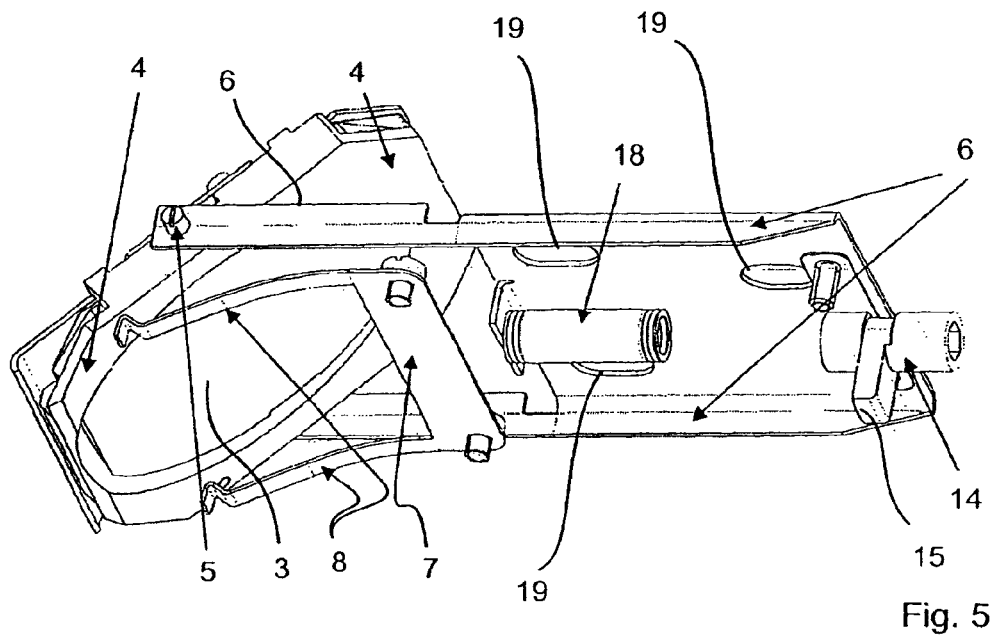
FIG. 5 shows a partial perspective view of the optics changer of FIG. 4.

The pivoting position of the receiving frame 4 in the target position is also shown in FIGS. 4 and 5, with the optics changer 1 being shown without the lens revolver support 11 for the purpose of better clarity of the illustration. The base frame 2 is further not shown in FIG. 5.

As a result of the pivoting movement, the first pressure spring 7 is pressed downwardly, so that the restoring force of the first pressure spring 7 presses the receiving frame 4 against the guide surface 13. In order to prevent that the optics changer 1 is thus pushed out of the changer chamber 10 again, a locking pin 15 is turned into a locking slit 16 of the lens revolver support 11 by means of a socket screw 14. The restoring force of the first pressure spring 7 is thus used for pressing the receiving frame 4 against the guide surface 13.

In addition, a second pressure spring 18 is provided between the intermediate frame 6 and a bottom part 17 of the base frame 2, which spring is used in the position as shown in FIG. 3 to press the intermediate frame 6, which is displaceable in the longitudinal direction relative to the base frame 2 in the direction, towards the guide surface 13.

As a result, the receiving frame 4 is pressed against the guide surface 13 in the region of the cylinder pins 5 (by the second pressure spring 18) and in the region of the contact points between the legs 8 of the pressure spring 7 and the receiving frame 4, through which the desired target position of the optical element can be achieved securely and can be maintained.

The two pressure springs 7 and 18 jointly form a holding unit together with the locking pin 15, the base frame 2, the intermediate frame 6 and the receiving frame 4, which holding unit holds the optical element 3 in the target position.

In order to ensure the longitudinal displaceability of the intermediate frame 6 in relation to the base frame 2, the intermediate frame 6 comprises three oblong holes 19 (FIG. 5), through which three fastening screws 20 (FIGS. 1, 4) are screwed into the bottom part 17 of the base frame 2 in order to fasten an upper part 21 of the base frame to the bottom part 17.

As a result of this longitudinal displaceability of the intermediate frame 6 relative to the base frame 2 and the fact that the cylindrical pins 5 are fastened with a predetermined play in the intermediate frame 6, it can be ensured that the receiving frame 4 rests optimally in the desired target position against the guide surface 13.

In order to remove the optics changer 1 from the lens revolver support 11, it is merely necessary to pivot out the locking pin 15 from the locking slit 16 by turning the socket screw 14, so that as a result of the restoring force of the first pressure spring 7 the receiving frame 6 can be pivoted back to the horizontal position and, as a result, a linear movement of the entire optics changer 1 from the lens revolver support 11 is effected together with the restoring force of the second pressure spring 18.

As is shown in FIGS. 1 to 7, the base frame 2 can have a substantially cuboid or plate-shaped base body 22, from which extend two mutually spaced legs 23. The optical element 3 is held to be rotatable or pivotable about an axis between the legs 23, which axis extends substantially perpendicular to the direction of extension of the legs 23. The legs 23 preferably extend in the direction of displacement during the insertion of optics changer 1, so that the planar arrangement of the optics changer 1 as shown in FIG. 1 is possible. The height of the insertion channel 9 can thus be very small, although the need for space of the optical element 3 in the target position is much higher in this direction of height (from the bottom to the top in FIGS. 2 and 3).

The optical element 3 is used in the position as shown in FIG. 3 to upwardly deflect by 90° a light bundle of 835 nm for example coming from the left, which light bundle extends through an optical channel K from the outside to the changer chamber 10, and thus to feed the light bundle into a lens (not shown) fastened to the lens contact surface 12. For this purpose, the optical element 3 stands under 45° in relation to the optical microscope axis, which in the representation of FIG. 3 extends from top to bottom.

The optical element 3 can be arranged as a narrow-band filter, e.g. a notch filter, in such a way that it reflects light of a narrow wavelength range and transmits light with wavelengths outside of the narrow wavelength range. The optical element 3 can be especially arranged in such a way that in FIG. 3 narrow-band light coming from the left and having a bandwidth of 15 to 50 nm and the center wavelength of 835 nm is deflected upwardly by 90°. The light passes through the lens (not shown) and is reflected on the sample to be examined or on the sample holder (e.g. a thin glass plate) and passes via the object back to the optical element 3 and is deflected by the same then to the left by 90° (as seen in FIG. 3). This deflected light can be detected and be used for an automatic focusing of the microscope. Since the optical element is transparent for visible light (e.g. in the range of 340 to 780 nm), the desired examination of the sample can be performed along the optical microscope axis (from bottom to top in FIG. 3) because this visible light is transmitted by the optical element 3. Detection in the infrared range is naturally also possible because light or electromagnetic radiation with wavelengths higher than 890 nm is also transmitted by the optical element 3.

Figure 8:
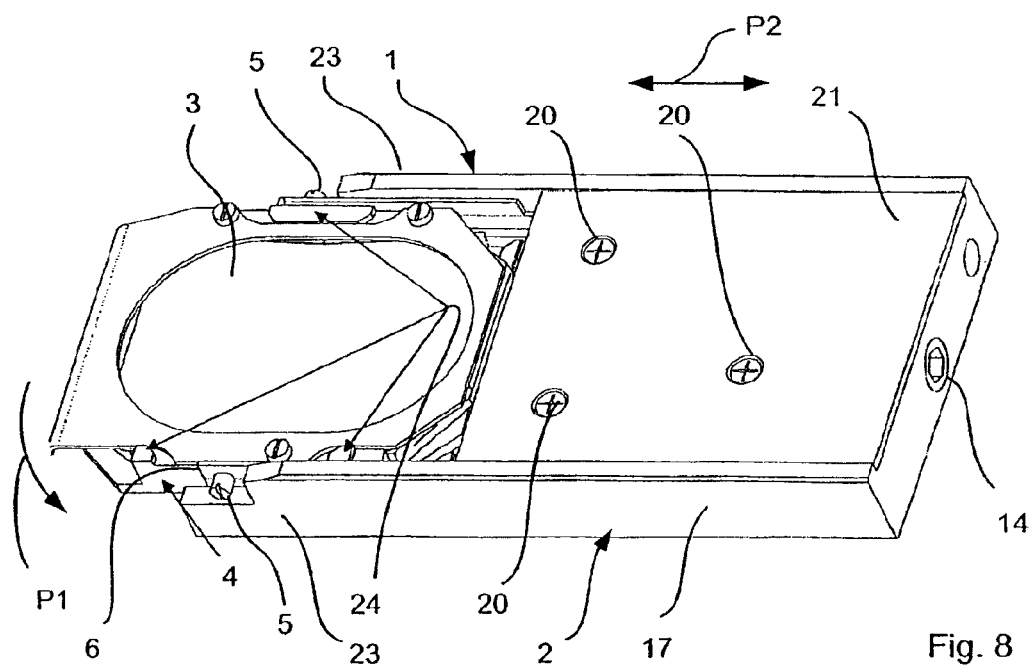
FIG. 8 shows a perspective view of a second embodiment of the second optics changer 1.

FIG. 8 shows a modification of the optics changer 1 of FIG. 1. In this modification, the receiving frame 4 comprises three contact surfaces 24 which are preferably arranged in such a way that the center of area of the receiving frame 4, together with the beam splitter 3 held therein, is disposed within the triangle opened up by the three contact surfaces 24. Preferably, the center of gravity of the receiving frame 4, including the beam splitter 3, is disposed in the center of area of the triangle opened up by the contact surfaces 24. The center of area preferably lies in the rotational axis of the receiving frame 4.

The receiving frame 4 rests precisely on the guide surface 13 by the three-point support on the contact surfaces 24.

The contact surfaces 24 can be arranged as a sphere or semi-sphere in a further development.

Furthermore, magnets can be built into the receiving frame 4 instead of pressure springs 7 and 18 according to a further development, which magnets pull and hold the receiving frame in the target position during the insertion of the optics changer 1 when the guide surface 13 is magnetic. The receiving chamber 10 is preferably arranged in such a way that when the optics changer is pulled out the receiving frame is folded back from the tilted position to the horizontal position, wherein a further magnet can be provided in the base frame 2 which holds the receiving frame 4 in the horizontal position.

Figure 9:
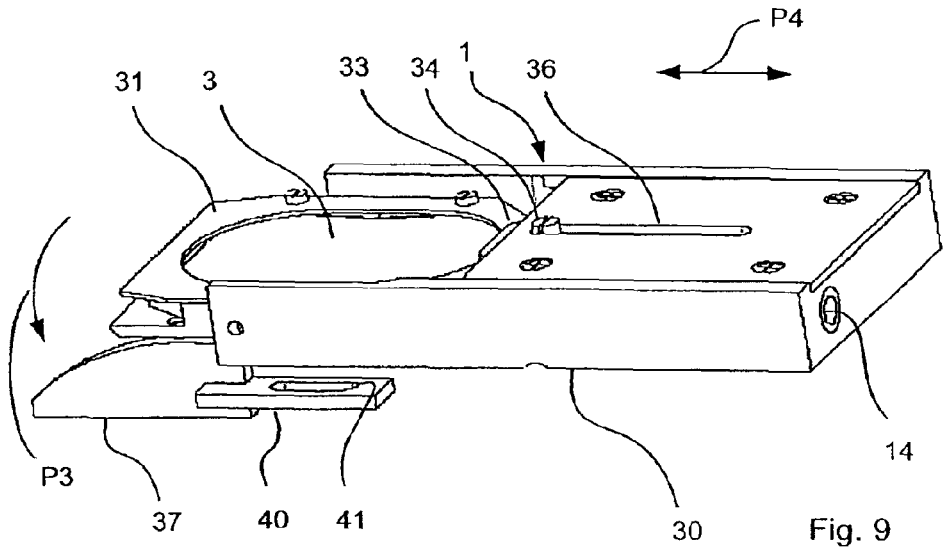
FIG. 9 shows a perspective view of a further embodiment of the optics changer in accordance with the invention.

FIG. 9 shows a further embodiment of the optics changer 1 in accordance with the invention. In this embodiment, the optics changer comprises a base frame 30 in which a receiving frame 31 for the beam splitter 3 is held in a directly rotatable manner. A first pressure spring 32 is provided between the receiving frame 31 and the base frame 30, which spring is shown partly in the illustration of FIG. 12 and causes the swiveling of the receiving frame 4 relative to the base frame 30 (arrow P3 in FIG. 9).

A stop element 33 is provided to prevent this swiveling in the basic position as shown in FIG. 9. The front end of the stop element 33 overlaps the receiving frame 31 and thus prevents a rotation of the receiving frame 31 (FIG. 9). The stop element 33 comprises a through-hole (not shown) into which a displacement screw 34 is screwed, of which the screw head is visible in FIG. 9. A second pressure spring 35 (FIG. 10) acts on the end of the stop element 33 facing away from the receiving frame 31, with the other end of the second pressure spring resting on the base frame 30. The stop element 33 is displaceable in the base frame 30 in the longitudinal direction (double arrow P4), with an oblong hole 36 extending in the longitudinal direction being provided for this purpose for the displacement screw 34. The second pressure spring 35 presses the stop element 33 and thus the displacement screw 34 to the position as shown in FIG. 9, so that the receiving frame 31 is fixed in the horizontal transport position.

Figure 10:
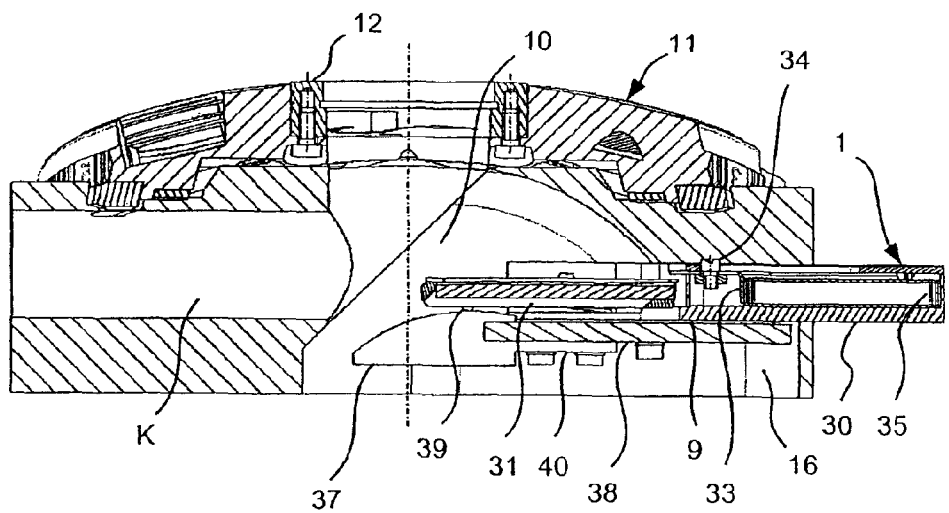
FIG. 10 shows a sectional view of the optics changer of FIG. 9 which is partly inserted in the lens revolver support.

Furthermore, FIG. 9 shows a curved plate 37 which is fixed in the lens revolver support 11 to a fastening plate 38, as is shown in FIG. 10.

Figure 13:
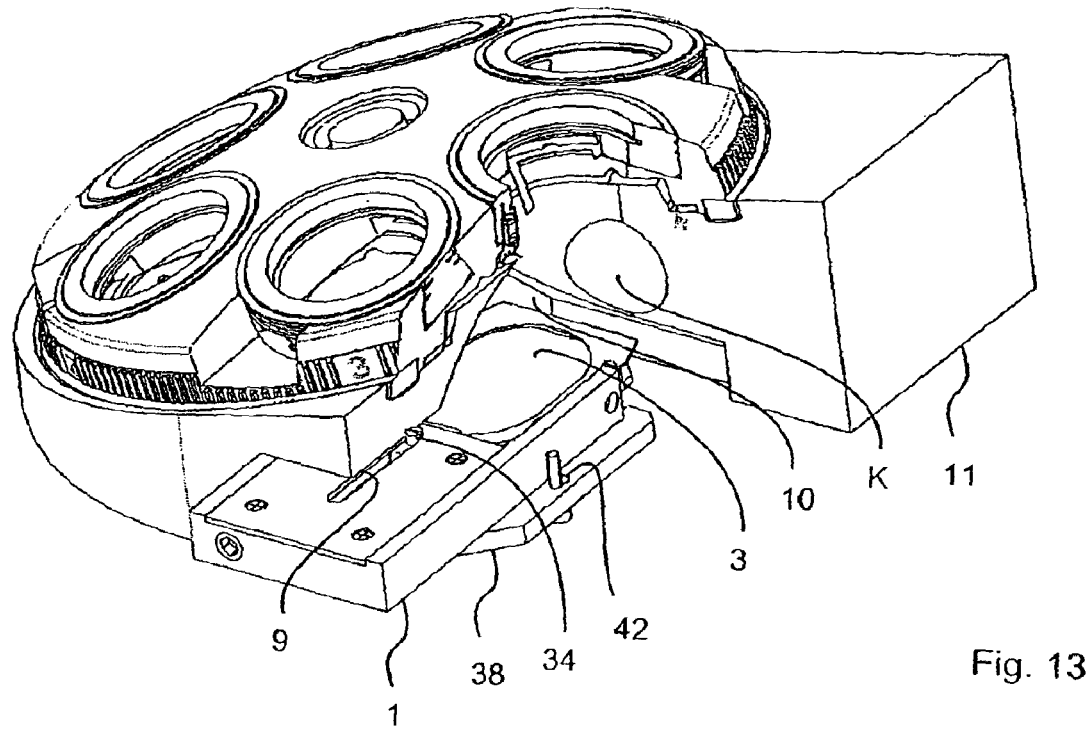
FIG. 13 shows a perspective view of the partly inserted optics changer of FIG. 9.

When the optics changer 1 of FIG. 9 is slid into the lens revolver support 11 through the insertion channel 9, the receiving frame 31 remains in the horizontal position up to the insertion depth shown in FIGS. 10 and 13. In this displacement position, there is already contact between a contact element 39 fixed to the bottom side of the receiving frame 31 and the curved plate 37, as is indicated in FIGS. 9 and 10. Furthermore, a stop (not shown) for the displacement screw 34 is provided in this insertion depth in the insertion channel 9, so that during further insertion of the optics changer 1 the displacement screw 34 is no longer entrained with the optics changer 1 and thus the distance between the displacement screw 34 and the rear end of the optics changer 1 will become smaller. As a result, the stop element 33 is displaced towards the rear end of the optics changer 1, so that the receiving frame 31 is no longer prevented from swiveling by the stop element 33.

Figure 11:
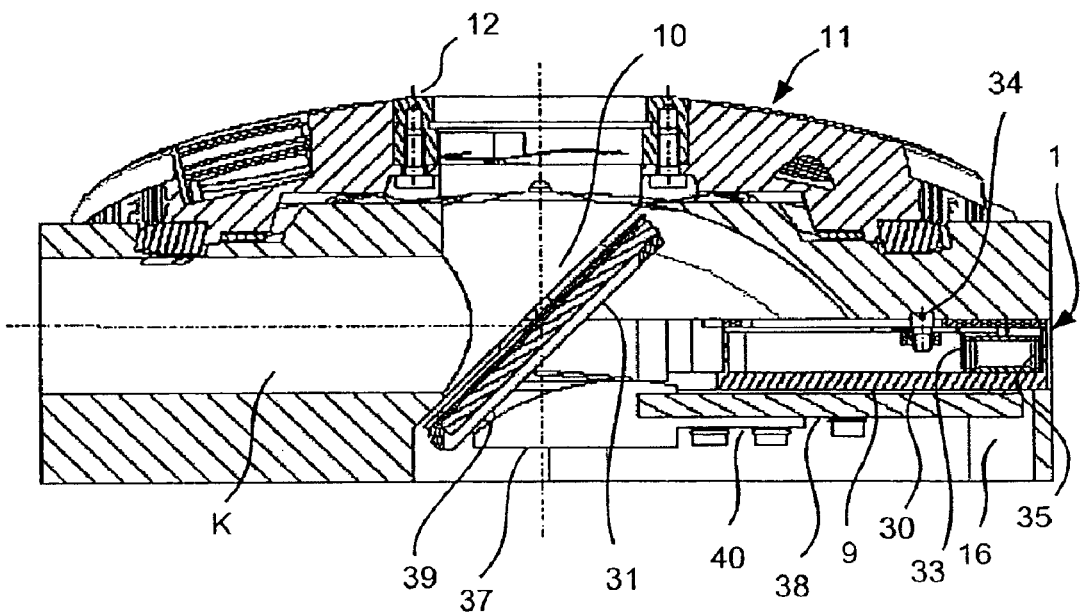
FIG. 11 shows a sectional view of the optics changer of FIG. 9 which has been fully inserted into the lens revolver support.
Figure 12:
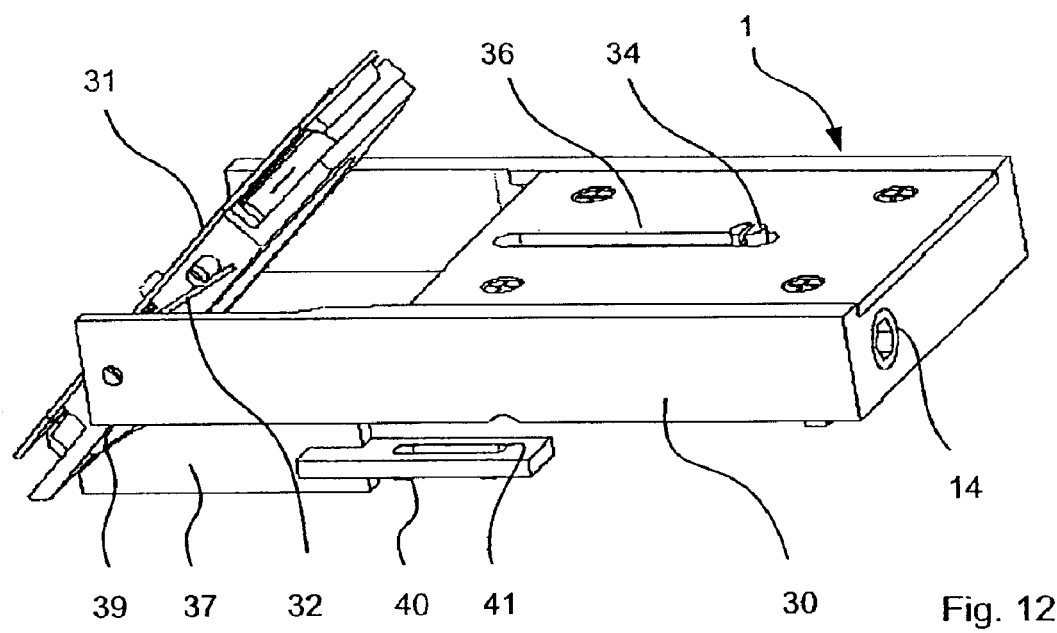
FIG. 12 shows a perspective view of the optics changer of FIG. 9 in the insertion position of FIG. 11.

Since the contact element 39 is pressed against the curved plate 37 as a result of the first pressure spring 32, further displacement will thus lead to the consequence that the contact element 39 will slide downwardly on the curved plate 37 and therefore the receiving frame 31 is swiveled relative to the base frame 30 until it reaches the target position as shown in FIG. 11. This target position is also shown in the illustration of FIG. 12.

Figure 14:
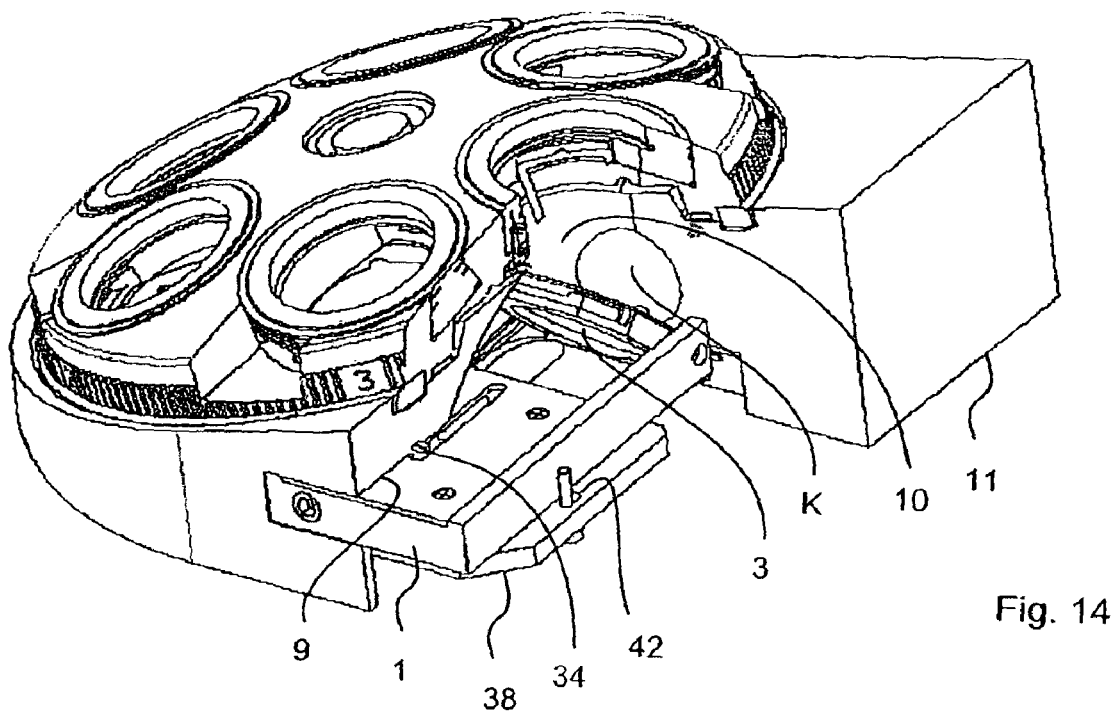
FIG. 14 shows a perspective view of the fully inserted optics changer of FIG. 9.

Once the optics changer 1 stands in the end position as shown in FIGS. 11 and 14 in which the receiving frame 31 and thus the beam splitter 3 is in the target position, a locking pin (not shown) of the base frame 30 can be swiveled into a respective recess (not shown) of the fastening plate 38 by means of the socket screw 14 in the same manner as in the first embodiment. It is thus prevented that the optics changer 1 will inadvertently move out of the lens revolver support 11 again.

The locking pin of the base frame 30 forms a holding unit together with the base frame 30, the receiving frame 31 and the first pressure spring 32, which holding unit holds the optical element 3 in the target position.

In order to pull the optics changer 1 out of the lens revolver support 11, it is merely necessary to twist the locking pin out of the recess by means of the socket screw 14. As a result of the restoring force of the second pressure spring 35 which was compressed during the insertion, the optics changer 1 is pressed out of the lens revolver support 11, and can then be removed, wherein the receiving frame 31 is swiveled from the swiveled position as shown in FIG. 11 to the horizontal position as shown in FIGS. 9 and 10 as a result of the curved plate 37. In this position, the stop element 33 overlaps the receiving frame 31 and is used as a stop in order to maintain the horizontal basic position of the receiving frame 31, so that the optics changer 1 can be pulled out of the lens revolver support 11 through the insertion channel 9.

As is shown in FIGS. 9 to 12, the curved plate 37 comprises a fastening section 40 with an oblong hole 41. The position of the curved plate 37 is thus adjustable in the insertion direction relative to the fastening plate 38, through which the tilt angle of the optical element 3 can be predetermined in the position of FIG. 11.

Furthermore, the fastening plate 38 also comprises an oblong hole 42, so that its position is adjustable in the insertion channel 9 in the longitudinal direction. In this way, the position of the tilted optical element can be predetermined in the direction of insertion in the end position as shown in FIG. 11.

Figure 15:
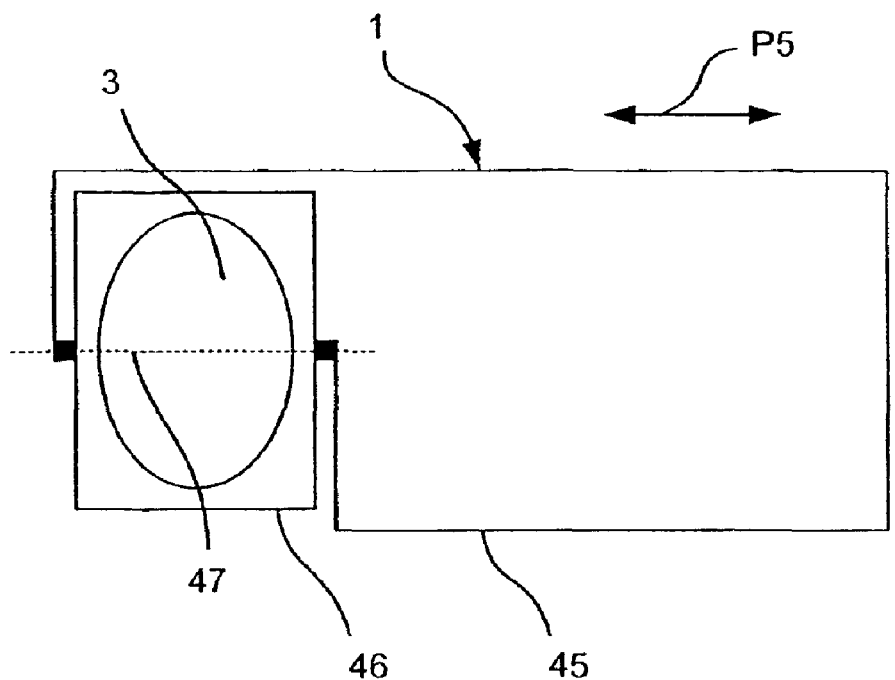
FIG. 15 shows a schematic top view of an optics changer according to a further embodiment.

FIG. 15 shows a schematic top view of a further embodiment of the optics changer 1 in accordance with the invention. The optics changer 1 of FIG. 15 comprises a base frame 45 which carries the optical element 3 held in a receiving frame 46. The receiving frame 46, and thus the optical element 3, is rotatably connected with the base frame 45 about a rotational axis 47. The rotational axis is not aligned perpendicularly to the direction of insertion, as in the previously described embodiments, which direction is indicated by the double arrow P5, but parallel to the direction of insertion. This alignment of the rotational axis is advantageous when the insertion channel 9 and the optical channel K enclose an angle of 90°.

Figure 16:
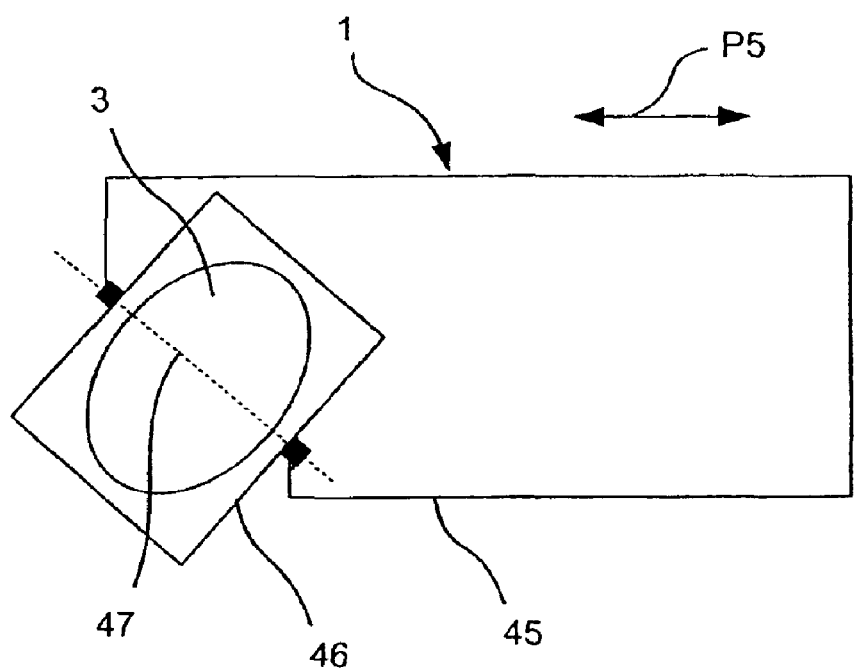
FIG. 16 shows a schematic top view of an optics changer according to another embodiment.

FIG. 16 shows a further modification of the optics changer 1 in a similar illustration as shown in FIG. 15, with the same elements being designated with the same reference numerals and with reference being made to the explanations made above concerning their description. The receiving frame 46 is held in such a way in the base frame 45 in the optics changer 1 of FIG. 16 that the rotational axis 47 encloses an angle of approx. 45° with the direction of forward feed (double arrow P5). This arrangement of the optics changer 1 can be used especially when the insertion channel 9 and the optical channel K enclose an angle of 45°. It is understood that also other angles are possible between the rotational axis 47 and the direction of insertion P5. The alignments of the rotational axis 47 as shown in FIGS. 15 and 16 can be provided in the optics changers described in connection with FIGS. 1 to 14.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An optics changer for arranging an optical element in a target position in a changer chamber of a microscope apparatus accessible from the outside via an insertion channel, the optics changer comprising:
a base frame; and
an optical element pivotably fastened to the base frame via a swivel mechanism, wherein the swivel mechanism effects a pivoting movement of the optical element when the optics changer is inserted through the insertion channel in the changer chamber starting at a predetermined insertion depth, and wherein after completing the insertion the optical element has been pushed and pivoted to the target position.

2. An optics changer according to claim 1, further comprising a guide for at least one of insertion and swiveling movement.

3. An optics changer according to claim 1, comprising a holding unit provided to the changer chamber for holding the optical element in the target position.

4. An optics changer according to claim 3, wherein the holding unit presses the optical element against a stop of the optics changer in the target position.

5. An optics changer according to claim 4, wherein the swivel mechanism arrests the optical element in a displacement position during the insertion of the optics changer up to a predetermined insertion depth and produces the swiveling movement from the displacement position from the predetermined insertion depth.

6. An optics changer according to claim 1, wherein the base frame includes two parallel legs, between which the optical element is arranged such that the swivel axis extends perpendicularly in relation to the direction of extension of the two legs.

7. An optics changer according to claim 6, wherein, in the target position, the optical element is tilted in relation to a plane in which both legs are disposed.

8. An optics changer according to claim 1, wherein the swivel axis is parallel to the direction of insertion through the insertion channel.

9. An optics changer according to claim 1, wherein the swivel axis has an angle range of 0° to 90° with the insertion direction.

10. An optics changer according to claim 1, wherein the optical element is arranged in a receiving frame, the receiving frame comprising three contact surfaces which rest in the target position on a guide surface in the changer chamber.

11. An optics changer according to claim 1, wherein the optical element is arranged in a receiving frame, the receiving frame being longitudinally displaceable relative to the base frame.

12. A microscope apparatus, comprising a changer chamber which is accessible from the outside via an insertion channel; and an optics changer, comprising:

a base frame; and an optical element pivotably fastened to the base frame via a swivel mechanism, wherein the swivel mechanism effects a pivoting movement of the optical element when the optics changer is inserted through the insertion channel in the changer chamber starting at a predetermined insertion depth, and wherein after completing the insertion the optical element has been pushed and pivoted to a target position.

* * * * *